United States Patent [19]

Overmyer et al.

[11] 4,104,774

[45] Aug. 8, 1978

[54] APPARATUS FOR APPLYING FILTER TO A DRAINAGE TUBING

[75] Inventors: Richard C. Overmyer, Francesville; Mario Guerra, Zionsville, both of Ind.

[73] Assignee: Francesville Drain Tile Corporation, Francesville, Ind.

[21] Appl. No.: 723,238

[22] Filed: Sep. 15, 1976

Related U.S. Application Data

[62] Division of Ser. No. 645,254, Dec. 29, 1975, Pat. No. 4,003,122.

[51] Int. Cl.² ............................................. B23P 19/04
[52] U.S. Cl. ..................................... 29/234; 29/235; 29/450; 17/41; 17/49; 53/13; 93/84 TW; 206/525; 206/802
[58] Field of Search .................. 29/235, 234, 450; 61/11, 72.6; 93/84 TW; 17/41, 49; 206/802, 303, 525; 138/118.1; 53/13, 390; 426/105

[56] References Cited

U.S. PATENT DOCUMENTS

| | | |
|---|---|---|
| 2,863,167 | 12/1958 | Nordin ..................................... 17/41 |
| 2,908,123 | 10/1959 | Muller et al. ...................... 53/390 X |
| 3,454,980 | 7/1969 | Washburn ............................ 17/41 X |
| 3,473,190 | 10/1969 | Kielsmeier et al. ...................... 17/41 |
| 3,731,346 | 5/1973 | Kupcikevicius ...................... 17/49 X |
| 4,021,885 | 5/1977 | Muller ................................. 17/49 X |

*Primary Examiner*—Charlie T. Moon
*Attorney, Agent, or Firm*—Jenkins, Coffey & Hyland

[57] ABSTRACT

Apparatus and method for applying a filter sleeve to a continuous length of drainage tubing. The filter sleeve is gathered and packed endwise on a tubular mandrel. The mandrel is received within a dispensing canister mounted on trench-digging and drain-laying equipment between a supply of drainage tubing and a trench plow and laying boot assembly. The drainage tubing passes through the mandrel as it progresses from the supply to the laying boot which installs it in the trench, and one end of the filter sleeve is connected to the tubing whenever filter covering is desired. When so connected, the filter sleeve is continuously pulled by the tubing off the mandrel and about said tubing, through a feed controller in the form of an annular diaphragm at the exit end of the mandrel.

14 Claims, 8 Drawing Figures

APPARATUS FOR APPLYING FILTER TO A DRAINAGE TUBING

This is a division of application Ser. No. 645,254, filed Dec. 29, 1975, now U.S. Pat. No. 4,003,122.

BACKGROUND OF THE INVENTION

This application relates generally to apparatus and method for applying filter material to continuous lengths of drainage tubing, and more specifically, to apparatus and method for applying such filter material to the drainage tubing as it is being installed in the ground.

Water drainage systems have a long history of use in cultivated agricultural areas and in residential developments for collecting and removing excess water from the soil. Typically, such drainage systems have comprised networks of clay or concrete tiles placed in open trenches which are then carefully back-filled. Importantly, the tiles are perforated or slightly spaced to allow excess ground water to seep into the tile network to be carried thereby away from the drained soil. The required steps of trench digging and back-filling, and of carefully laying individual tiles in the trench, are time-consuming and tedious tasks. For this reason, conventional drainage tiles have to a large degree given way to more modern and convenient drainage conductors such as continuous lengths of flexible plastic tubing. For example, U.S. Pat. Nos. 3,374,634 and 3,699,684 show flexible platic tubing which is corrugated for flexibility and high strength and has spaced openings to admit ground water. Such plastic tubing is advantageous in that it is lightweight and long-lasting and can be quickly and easily laid in continuous lengths and does not use short lengths which are easily dislodged during trench back-filling, as occurs with tile. Further, the continuous lengths of plastic tubing are especially suitable for use with modern trenching and laying equipment which continuously and simultaneously digs a trench and lays the drainage tubing, and may also back-fill the trench. Such tubing is also especially suitable for use with what may be termed "closed" trench laying in which a sturdy plow blade and boot forms a slot and lays the tubing without actually excavating a trench.

A major problem with many underground drainage systems is that the drainage collectors tend to become clogged with sediment or silt carried into them by the water. This is especially the case when the drainage tubing is placed in soil composed of fine, loosely packed particles such as fine sand or other light topsoil. A particular drainage field may contain some areas where silting occurs and others where it does not tend to occur, as in natural beds of gravel. In the past, the sediment or "silting" problem has been attacked by laying a bed of gravel about selected portions of the drainage collectors so as to provide a rough filter between light soil and the collector. This procedure has not been totally satisfactory, however, because the gravel also tends to become clogged, and because the time and material needed to lay the gravel bed is economically prohibitive. Further, a gravel-bed filter is totally incompatible with modern drain-tube installing equipment which continuously and simultaneously forms a trench or slot in the ground and lays drainage collectors therein.

In more recent efforts to overcome the silting problem, various other filter materials and systems for applying them to drainage tubing have been proposed. These include, for example, wrap-around filters of porous mats formed from straw or coconut fibers and wraps and sleeves of filter cloth such as woven fabric of nylon or other plastics, non-woven fabrics of polyester, etc. Such filters are typically applied to the tubing under factory conditions of an industrial plant away from a drain-laying job site, and the filter-covered conduit is transported to the job site for installation. Alternately, these filter materials are sometimes applied to drainage conduit after it is placed in an open trench. Both of these methods have serious drawbacks. For example, applying the filter to the conduit away from the job site subjects the filter to damage during handling and transport, and does not readily permit filter to be applied at only those portions of the drainage field where it is required and omitted elsewhere. Similarly, placing the filter about the tubing after the tubing is in the ground is slow and laborious, and may require the tubing to be suspended in the trench as the filter is placed about it. This procedure also involves the danger of damage to the filter and of leaving gaps in the filter covering. Further, the "in the ground" filter placement is impossible with modern trenching and laying equipment since the filter must be applied by hand in an open trench.

The present invention provides apparatus and a method for applying a tubular filter sleeve to continuous lengths of drainage tubing as such tubing is being laid with mechanized equipment, without subjecting the filter to damage from handling or transporting filter-covered conduit. It allows convenient application of the filter about continuous lengths of tubing where it is desired and omission of the filter from the tubing where it is not required. Further, the invention provides for installing filter without substantially increasing installation time of a drainage system, and is compatible with modern mechanized trenching and laying equipment, and is easy to use and economically feasible.

SUMMARY OF THE INVENTION

In accordance with the invention, a filter sleeve dispenser is mounted on a trenching and laying machine between a supply of continuous drainage tubing and a laying boot which lays the tubing in a trench being formed by the machine. The dispenser contains a tubular mandrel through which the tubing passes on its way to the laying boot, and which is of sufficient size to freely pass the tubing and the collars by which successive lengths of tubing are connected. A long tubular length of filter sleeve is gathered and packed tightly on the mandrel, and from this the filter sleeve is fed off onto the tubing through a feed controller as the tubing passes through the dispenser.

Preferably, the mandrel is mounted in a supporting canister and carries an enlarged collar at one end, desirably the entrance end. The collar is used to position the mandrel in the assembly and serves as a stop against which the filter sleeve is gathered and packed or crammed when the mandrel is loaded with such sleeve. The opposite end, desirably the exit end of the mandrel, is unobstructed to allow the sleeve to be drawn off. The feed controller is desirably in the form of an annular diaphragm of rubber or other elastomer mounted adjacent the exit end of the mandrel and having an inside diameter equal to or slightly smaller than the outside of the tubing. The filter sleeve being fed off the mandrel is drawn through this diaphragm, between it and the advancing tubing, and is thus fed smoothly and evenly onto the tubing.

In a drain-laying operation, a continuous length of drainage tubing passes through the mandrel as it travels from the tubing supply to the laying boot. When filter sleeve is desired about the drainage tubing, the free end of said filter sleeve at the end of the mandrel adjacent the feed controller is suitably attached to the drainage tubing, as with tape. Then, as the drainage tubing progresses, it pulls the filter sleeve off the mandrel and about itself. The feed controlling diaphragm controls the rate at which the filter sleeve is drawn off the mandrel, and thereby prevents bunching and protects the sleeve from damage. In the event filter sleeve is not desired about the pipe, the filter sleeve is severed to allow the pipe to travel through the mandrel without carrying the filter therewith.

BRIEF DESCRIPTION OF THE DRAWINGS

The accompanying drawings illustrate the invention. In such drawings.

DETAILED DESCRIPTION OF THE PREFERRED EMBODIMENT

Figure 1:
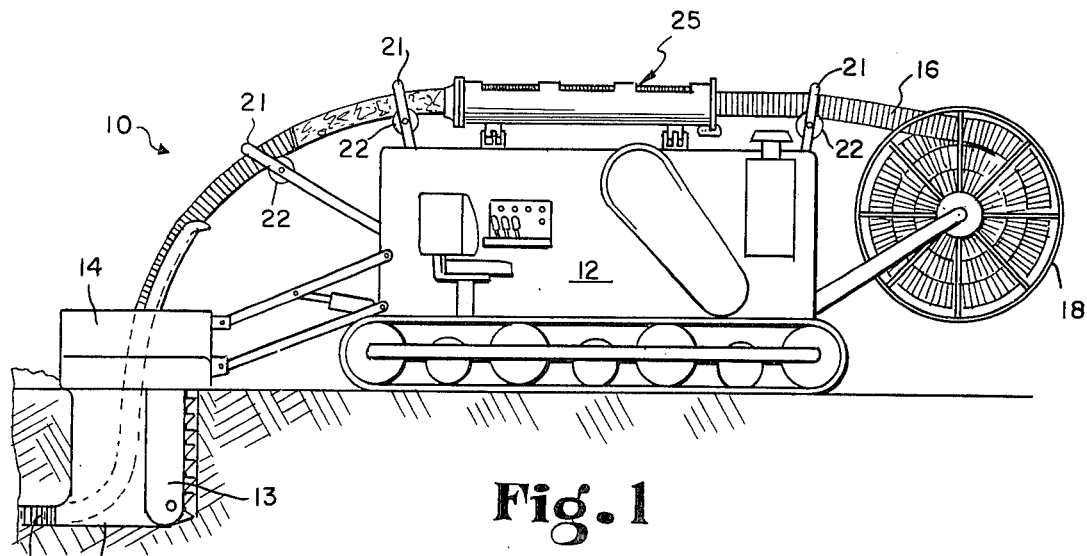
FIG. 1 is a side elevation of a trenching and drain-laying machine having a filter dispenser of this invention mounted thereon.

A trench digging machine 10 representative of modern equipment commonly used for laying drainage tubing is shown in FIG. 1, and generally comprises a self-propelled tractor 12 having a rear plow assembly 14 which includes an excavator 13 for digging a continuous trench of the desired depth and width and a laying boot 15 for simultaneously feeding to and laying in the trench a continuous length of flexible drainage tubing 16. The trench may be immediately back-filled concurrently with laying the tubing, by blades carried with the plow assembly 14, or may be left for later filling with other equipment. Also, the plow assembly may be of the type which forms a slot and lays the tubing without excavating an open trench.

A large supply reel 18 is rotatably mounted on the front of the tractor 12, and carries a relatively long length of flexible drainage tubing 16. Commonly, this tubing 16 is corrugated plastic tubing having circumferentially spaced openings along its length for the admission of water. Examples of such plastic tubing are shown by U.S. Pat. Nos. 3,374,634 and 3,699,684. From the reel 18, the tubing is fed over the tractor 12 through guides 21 to the plow assembly 14. Conveniently, the guides 21 have rollers 22 thereon to aid the progress of the tubing over the tractor. In accordance with the present invention, the tubing 16 passes through a filter dispenser 25 mounted on top of the tractor, for selective application of filter material to the tubing as such tubing travels from the reel to the laying boot 15 and the trench.

Figure 2:
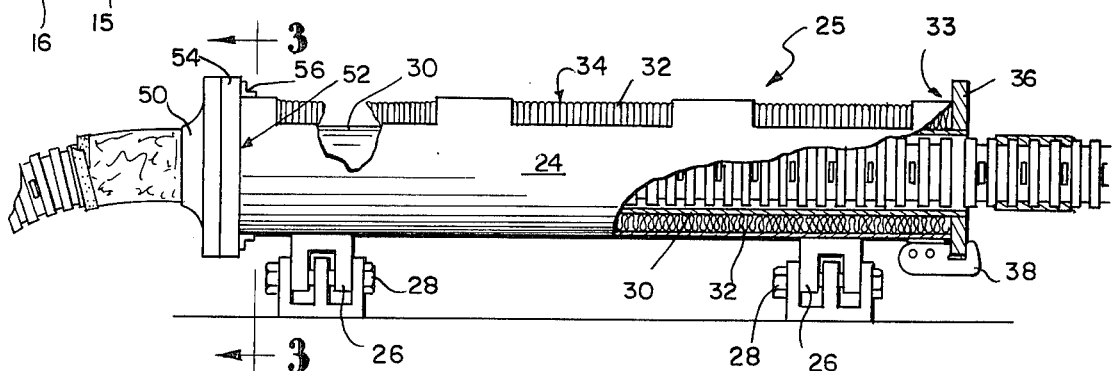
FIG. 2 is an enlarged side elevation of the filter dispenser of FIG. 1, with portions thereof broken away.
Figure 3:
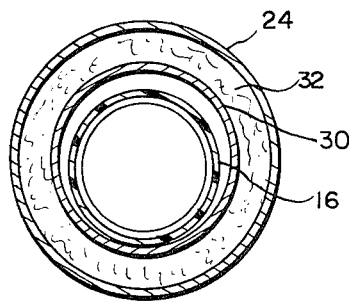
FIG. 3 is a vertical section taken on the line 3—3 of FIG. 2.
Figure 4:
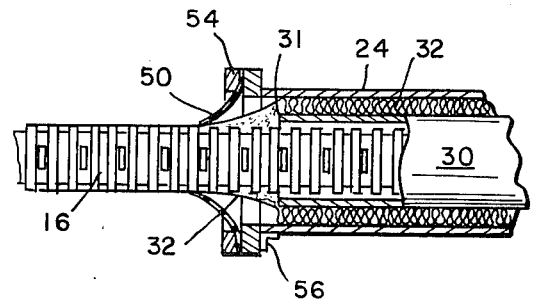
FIG. 4 is a fragmented horizontal section taken on the line 4—4 of FIG. 2.

The filter dispenser 25 is shown in detail in FIGS. 2-4, and comprises an outer cylindrical canister 24 of sheet metal or the like. The canister has a pair of brackets 26 near each end thereof by which it is mounted with bolts 28 to brackets on the tractor 12. The canister 24 may be of a convenient length to suit the length of sleeve to be dispensed and the size of the tractor 12, say from about five to ten feet, and has an inner diameter sufficient to receive a tubular mandrel 30 having a length of tubular filter sleeve 32 gathered thereon. Conveniently, the canister has openings 34 formed in its upper surface for observing the filter material.

The mandrel 30 is formed from cardboard, plastic, sheet metal, or the like, and comprises a cylindrical tube having a length slightly less than the length of the canister 24. The mandrel tube has a rear or entrance end suitably joined to an enlarged collar 36, and a front or exit end 31 which is unobstructed. As shown in FIG. 2, the mandrel has an outer diameter sufficiently less than the inner diameter of the canister to allow slidable reception of both the mandrel and the filter material thereon into the rear end 33 of the canister 24. Said mandrel is slidable forwardly within the canister until the mandrel collar 36 abuts the canister rear end 33. A clamp 38 on the canister engages the mandrel collar to hold the mandrel in place in said canister.

The front end 52 of the canister carries an annular elastomeric diaphragm 50 clamped between two rings which form a collar 54 on the canister. As shown, the rings are mounted on the canister by brackets 56. The diaphragm 50 has an inner diameter approximately equal to or slightly less than the outside diameter of the drainage tubing 16 so that the diaphragm will yieldably engage and wipe the tubing 16 as it exits from the filter dispenser 25 and travels toward the plow assembly 14 for installation in the ground.

Figures 5, 6, 7:
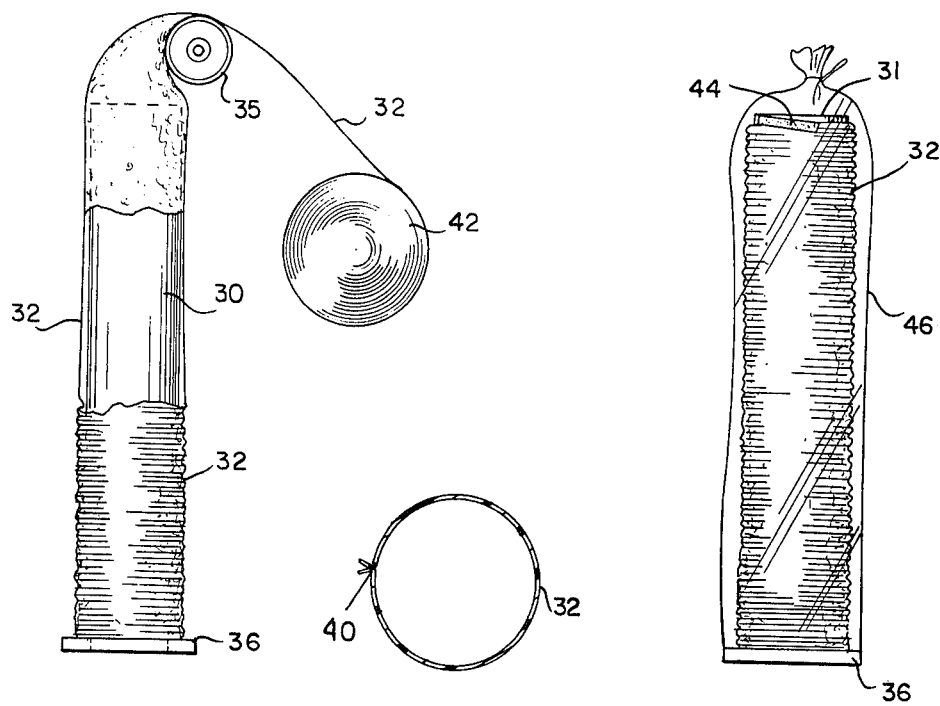
FIG. 5 is a sectional view showing a tubular filter sleeve which may be used in accordance with the invention.
FIG. 6 is a schematic diagram illustrating the loading of a tubular filter sleeve on a mandrel.
FIG. 7 is a side elevation of a filter package containing a mandrel loaded with filter material.
Figure 8:
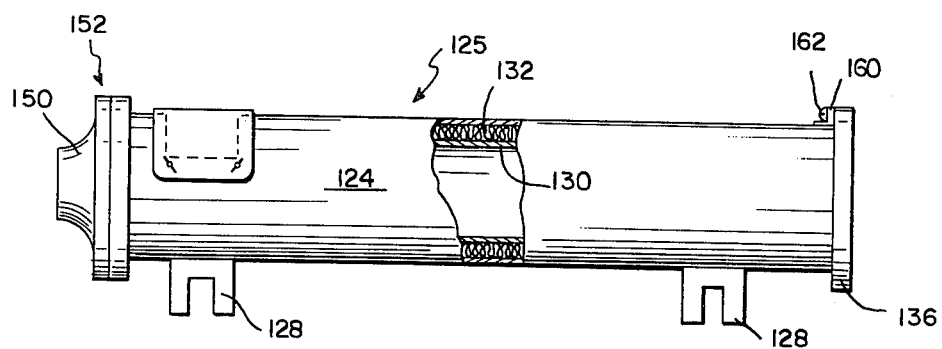
FIG. 8 is a side elevation of an alternate form of filter dispenser, with portions thereof broken away.

The filter material on the mandrel 30 is preferably a long tubular sleeve 32 of uniformly porous, non-woven, lightweight filter cloth, such as spunbonded polyester non-woven cloth sold by E. I. DuPont de Nemours and Company, Wilmington, Del. U.S.A., under the trademark REEMAY. Alternately, the filter material may be a sleeve formed from nylon, fiberglass, etc. As shown in FIG. 5, a filter sleeve 32 of the appropriate diameter may be made by folding a strip of sheet material transversely on itself and joining its free edges with a heat-seal seam 40. Alternatively, the edges may be seamed in lapped relation. As shown in FIG. 6, the formed sleeve is fed from a roll 42 over a supporting reel 35 and thence downward onto the tubular mandrel 30 where it is tightly gathered and crammed first against the mandrel collar 36, and then along the entire length of the mandrel. This gathering can be done manually, or by a suitable machine. In practice, the sleeve 32 has a diameter approximately one to one and one-half inches greater than the diameter of the mandrel so that it can be gathered on the mandrel, and the loaded mandrel can carry a filter sleeve many times longer than its own length. Preferably, the mandrel carries a length of sleeve of the order of from 100 to 200 times its own length, so that a five-foot mandrel may carry from 500 to 1,000 feet of filter sleeve. Using polyester non-woven cloth (REEMAY) weighing 0.6 ounces per square yard, it has been found that up to 800 feet or more of filter sleeve can be gathered on a mandrel tube five feet in length. Loaded mandrels may be packaged as shown in FIG. 7. The end of the gathered sleeve 32 at the front end 31 of the mandrel tube is secured as by tape 44, and the assembly is enclosed in a protective plastic wrapper 46 for storage and transportation to a drain-laying job site. At the job site, the loaded mandrel is removed from the wrapper and inserted in the dispensing canister 25 mounted on the trenching tractor 12. As shown in FIG. 2, the mandrel 30 and its associated collar 36 have an inner diameter sufficient to freely pass the drainage tubing 16 and the connecting collars 48 by which successive pipe lengths are commonly connected.

Operation is as follows: As the tractor 12 progresses across the drainage field, the excavator 13 of its plow assembly 14 cuts a trench and its boot 15 lays the continuous drainage tubing 16 in such trench as it is dug. The tubing is drawn from the reel 18 and passes through the guides 20 and the filter dispenser 25 as it moves to the boot 15 of plow assembly 14. The filter sleeve may be applied to the tubing selectively, as required by the soil conditions in which the tubing is being laid.

When filter is desired on the drainage tubing during a laying operation, the end of the filter sleeve 32 at the exit end 31 of the mandrel is pulled out through the diaphragm 50 and fastened to the drainage tubing 16, preferably about its entire circumference, as by a band of tape 58 or the like shown in FIG. 2. Then, as the tubing travels from the reel 18 to the plow assembly, it passes continuously through the filter dispenser 25 and pulls the filter sleeve 32 off the mandrel and about itself. As this occurs, the annular diaphragm 50 wipes the filter sleeve onto the tubing as the tubing progresses and feeds the sleeve smoothly and uniformly onto the tubing, while preventing excess filter sleeve from slipping off the mandrel, and thereby preventing bunching or tearing of the filter sleeve. Conveniently, the openings 34 in the canister 24 allow the machine operator to observe the quantity of unused filter sleeve 32 during the laying operation. When all of the sleeve is used, the tractor is stopped, the drainage tubing is cut adjacent one end of the filter dispenser and withdrawn therefrom, the empty mandrel is then replaced with a loaded one, the tubing is then reinserted through the dispenser and reconnected to the forward length of pipe by a connecting collar 48, and the drain-laying operation is then resumed.

When filter sleeve is not desired about the drainage tubing 16, the application of said filter sleeve to the tubing is easily stopped. This is done by severing the filter sleeve at the diaphragm to allow the tubing to pass freely through the dispenser 25 without pulling the filter sleeve along with it. Desirably, the trailing end of the sleeve portion already applied to the pipe is fastened to the pipe as by taping to prevent dirt from getting inside the filter sleeve. To resume covering the tubing with the filter sleeve, the sleeve is re-attached to the drainage pipe as with a band of tape 58, as described above.

When a full mandrel 30 is in place, with a full thick covering of gathered filter sleeve thereon, the full mandrel is cradled in the canister and supported throughout its length by engagement of the filter sleeve layer with the bottom wall of the canister. The mandrel is also held against forward movement by engagement of its collar 36 with the rear end of the canister, so that its front end remains in proper spaced relation with the diaphragm 50 to permit that diaphragm to perform its feed controlling function. As the filter sleeve is drawn off, the forward end of the mandrel will no longer be supported by the thick layer of gathered filter sleeve, but such forward end will be held in alignment with the diaphragm 50 by the presence of the tubing 16 extending and moving forward through the mandrel and diaphragm, and the sleeve will continue to be drawn off the forward end of the mandrel until it is entirely used.

An alternate embodiment of the dispenser of this invention is shown in FIG. 7. As shown, the dispenser 125 comprises an outer cylinder 124 having a double-ring collar 154 at its forward end 152 which holds an elastomeric diaphragm 150. The canister slidably receives a mandrel 130 having a filter sleeve 132 packed thereon in the same manner as described above. A mandrel collar 136 is fixed to the mandrel 130, and is removably fastened to the canister 124 by brackets 160 and screws 162. In this embodiment, the canister 124 and mandrel 130 are assembled as a self-contained dispenser at the place of manufacture and away from the job site. The resulting package is handled and shipped as such. It is placed in use by mounting it on the trenching and laying equipment by means of brackets 128 in the same manner as in the modification of FIGS. 1–2. With this embodiment, the filter sleeve 32 is protected by the outer cylinder during transport and handling. When the filter sleeve in the dispenser is used, the entire dispenser is replaced by a fresh dispenser 125, and the used dispenser is returned to the packaging plant where it is disassembled and the mandrel re-loaded. The use of a self-contained dispenser is of advantage when different tubing sizes are to be laid by the same machine since it permits dispensers of different size filter sleeves to be installed on the trenching machine with little or no change of the equipment carried by that machine.

We claim:

1. Apparatus for applying filter cloth or the like to a continuous length of flexible drainage tubing as such tubing is being installed in the ground by a laying machine, comprising a tubular mandrel of a size to freely pass the tubing lengthwise therethrough and having an entrance end and an exit end, a long tubular sleeve of filter cloth or the like, larger than the mandrel, gathered and packed on the mandrel, means to support said mandrel, with the packed sleeve thereon, on a laying machine in a position for passage of the tubing through the mandrel as the tubing is being laid, so that by attaching the end of the sleeve to the tubing, such sleeve will be drawn off the mandrel as the tubing passes therethrough on its way to installation, said support means receiving and supporting the mandrel for ready removal therefrom and having mandrel-stop engaging means at the entrance end of the mandrel for positioning the mandrel in a predetermined axial position, the mandrel having mandrel-stop means at its entrance end for engaging said stop-engaging means, and feed-controlling means mounted at the exit end of the mandrel, in predetermined relation with said mandrel-stop engaging means, for controlling the rate at which the filter sleeve is drawn off the mandrel.

2. Apparatus as in claim 1 in which the feed-controlling means is disposed outside the sleeve and the sleeve travels thereacross as it is drawn off the mandrel and onto the tubing.

3. Apparatus as in claim 1 in which the feed-controlling means is an annular flexible diaphragm mounted adjacent the exit end of the mandrel in position to engage the surface of the tubing as it exits from the mandrel, the filter sleeve passing between the diaphragm and the tubing as it is drawn off the mandrel.

4. Apparatus as in claim 1 in which the mandrel carries a collar at its entrance end by which it is held in place in its mounting and against which the filter sleeve is gathered and packed.

5. Apparatus as in claim 1 in which the mandrel carries a collar at its entrance end against which the filter sleeve is gathered and packed.

6. Apparatus for applying filter cloth or the like to a continuous length of flexible drainage tubing as such tubing is being installed in the ground by a laying machine, comprising a tubular mandrel of a size to freely pass the tubing lengthwise therethrough and having an entrance end and an exit end, a long tubular sleeve of filter cloth or the like, larger than the mandrel, gathered and packed on the mandrel, means to support said mandrel, with the packed sleeve thereon, on a laying machine in a position for passage of the tubing through the mandrel as the tubing is being laid, so that by attaching the end of the sleeve to the tubing, such sleeve will be drawn off the mandrel as the tubing passes therethrough on its way to installation, and feed-controlling means mounted at the exit end of the mandrel for controlling the rate at which the filter sleeve is drawn off the mandrel, said support means comprising a canister having mounting means for mounting the same on a laying machine, said canister being shaped to contain and support the mandrel and its load of filter sleeve, the feed-controlling means being mounted on the canister at the exit end of the mandrel, and the mandrel having stop means at its entrance end engaged with the canister to position the mandrel and its exit end in spaced relation with the feed-controlling means.

7. Apparatus as in claim 6 in which said feed-controlling means is an annular member having a central opening aligned with the mounted position of the mandrel and of a size to closely surround the sleeve as it is being drawn off the mandrel and onto the tubing passing through the mandrel and annular member, and thereby to maintain alignment of the mandrel as the covering of the sleeve is progressively withdrawn therefrom.

8. Apparatus as in claim 6 in which the feed-controlling means is a flexible diaphragm mounted about the path of the tubing and extending inward to engage the periphery of the tubing as it leaves the mandrel.

9. Apparatus as in claim 6 in which the canister includes a cylindrical wall positioned to underlie the mandrel and its covering of gathered filter sleeve.

10. Apparatus as in claim 6 in which the canister is arranged for permanent mounting on the laying machine and the mandrel is removably replaceable therein.

11. Apparatus as in claim 6 in which the canister and mandrel are assembled as a self-contained package and the canister mounting means is arranged for removable mounting on a laying machine.

12. Apparatus as in claim 6 in which the canister is a cylindrical housing of a size to receive a loaded mandrel axially therein, and said mandrel has a collar at one end which engages the end of the canister when the mandrel is inserted therein.

13. Apparatus as in claim 1 in which said mandrel carries a length of filter sleeve in excess of 100 times the length of the mandrel.

14. Apparatus for applying a covering material to drainage tubing concurrently with installation thereof in the ground, comprising a cylindrical canister, a tubular mandrel, a long sleeve of filter material gathered on said mandrel, said mandrel being receivable with the covering material thereon within said canister and having an inside diameter sufficient to allow slidable passage of the drainage tubing therethrough as said tubing is installed in the ground, said mandrel having its one end unobstructed at which the tubing exits to allow the filter material when attached to the tubing to be pulled by the tubing off said mandrel and about the tubing, and means mounted on said canister adjacent the unobstructed mandrel end for limiting the rate at which the covering material is pulled off said mandrel.

* * * * *